B. O. DAHL.
HOE.
APPLICATION FILED OCT. 22, 1912.

1,105,760. Patented Aug. 4, 1914.

Witnesses
Byron B. Collings
H. H. Byerle

Inventor
B. O. Dahl,
J. A. Mathews
Attorneys.

UNITED STATES PATENT OFFICE.

BERENT O. DAHL, OF VIROQUA, WISCONSIN.

HOE.

1,105,760. Specification of Letters Patent. Patented Aug. 4, 1914.

Application filed October 22, 1912. Serial No. 727,192.

*To all whom it may concern:*

Be it known that I, BERENT O. DAHL, a citizen of the United States, residing at Viroqua, in the county of Vernon and State of Wisconsin, have invented certain new and useful Improvements in Hoes, of which the following is a specification.

The present invention relates to hoes, and consists in the combinations and arrangements of parts hereinafter described and fully set forth in the accompanying claim.

The invention has for its purpose to provide a hoe whose construction will adapt the implement for a greater sphere of usefulness than is now obtained in hoes generally used, and one which is particularly adapted for removing weeds from the ground by severing the roots of the weeds at a point well below the ground surface.

Figure 1:
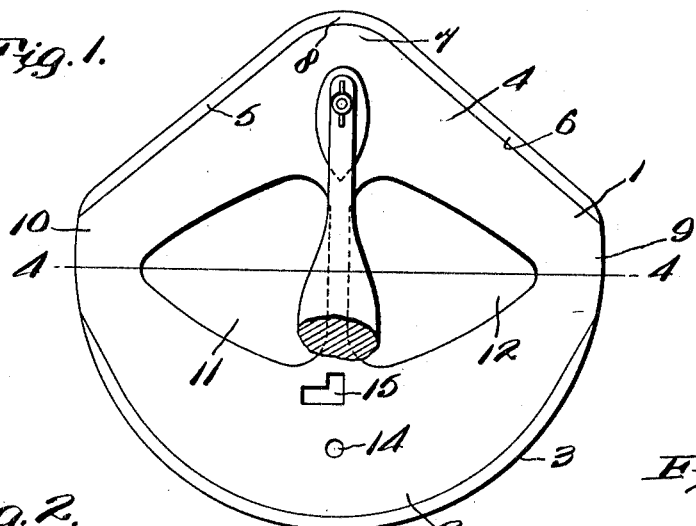
Figure 2:
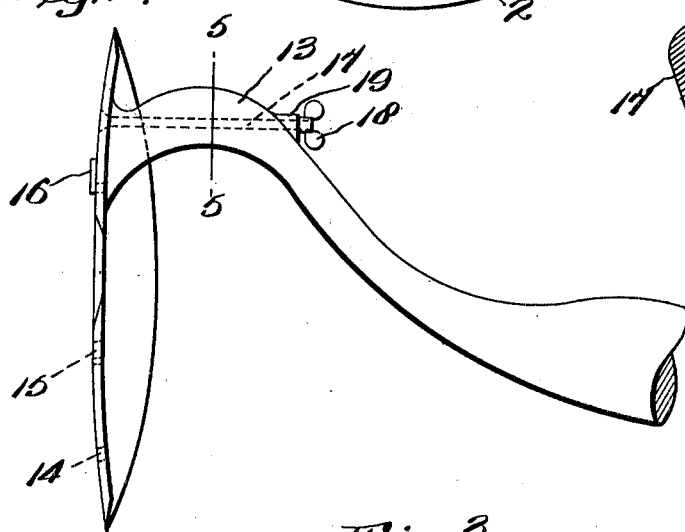
Figure 5:
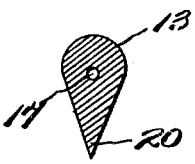
Figure 3:
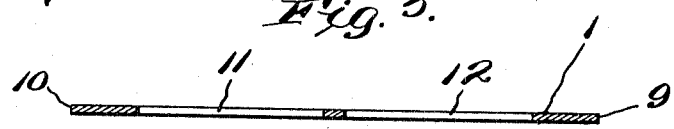
Figure 4:
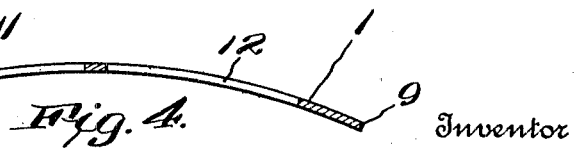

With these and other objects in view the invention consists in the arrangement and combination of parts hereinafter claimed, and, while the invention is not restricted to the exact details shown and described, still, for the purpose of disclosure, reference is had to the accompanying drawings, in which like reference characters designate the same parts in the several views, and in which, Figure 1 is a rear elevational view of the hoe; Fig. 2 is a side elevational view thereof showing the manner of securing the hoe to the shank; Figs. 3 and 4 illustrate respectively, modifications in the form of the blade, and Fig. 5 is a transverse sectional view of the hoe shank taken on the line 5—5 of Fig. 2.

Referring to the construction in detail, the hoe consists of a blade or plate 1 having a semi-circular part 2, whose edge 3 is, for the greater extent, sharpened to provide the cutting element. The opposite section or portion 4 of the blade is designed with straight and substantially right angularly disposed edges 5 and 6, which are sharpened in like manner as the edge 3 of the rounded portion 2. The cutting portion 7 of the hoe section 4 has the edge 8 thereof rounded, after the manner indicated in Fig. 1, and said edge 8 provides a suitable and effective cutting member when it is desired to have the hoe penetrate deeply in the ground. The side portions 9 and 10 of the blade 1 are also rounded for convenience in manipulating the tool, and for the further purpose of enabling either of the cutting edges aforementioned to be used with the greatest effect.

The central portion of the blade or plate 1 is cut away, as at 11 and 12, the purpose thereof being to reduce the weight of the metal and also to enable the blade to better work through the ground since the dislodged earth will pass through the openings 11 and 12, and thus reduce the resistance which would otherwise be offered by this material were the blade not so cut-away. In its entirety, the blade 1 is shaped after the manner indicated in Figs. 2 and 4, as will be readily understood.

The hoe blade 1 is adapted for use with either the section 2 or the section 4, according to whether the round or straight cutting edge is desired, and to that end the hoe shank 13 is adapted to be fitted to the blade 1 in the different places. Said blade is provided on its portions 2 and 4 respectively with a rounded aperture 14 and an angularly designed aperture 15. The hoe shank 13 is provided with a lug 16 which fits within the opening 15, and a bolt 17 passes through the aperture 14 and through the hoe shank 13 as shown in Fig. 2, and in which position said bolt 17 is secured by a thumb nut 18 that seats against a shoulder 19 formed integrally with the hoe shank 13, as shown. The hoe shank 13 is in cross-section of substantially that design shown in Fig. 5, whereby to provide a sharp edge 20 which will offer little or no resistance to the ground when the hoe has penetrated the earth to the extent that the shank contacts with the surface thereof. There is the further advantage that the cutting edge 20 will itself enable the hoe shank to enter the ground without strain on any of the parts.

The points of merit or advantage alleged for the construction of hoe shown herein may be summarized as follows: The round cutting edge enables the roots or weeds being cut at a greater distance below the surface of the ground and with more certainty than with straight edge hoes; the round cutting edge affords a greater extent of working surface and thereby insures the severing of a greater number of the weeds or the like. Distinct from this the pointed hoe is at fault in that it works only on one side or the other of the object to be severed as, for instance, the root of a weed. The round edge hoe, as shown herein, gives a balance to the hoe and prevents the handle from twisting in the hands of the user, and said round edge hoes cannot be thrown to one side or the other of the object to be cut, or rather it cuts straight through such objects.

The design of shank for the hoe handle will overcome the disadvantages attending the striking of weeds as with hoes having round shanks. The round edge, or the angularly disposed straight edges, will enable the hoe to more easily penetrate the ground, and will also enable the working of more earth than with pointed or straight edge hoes. The hoe shown herein is also better adapted for working in inaccessible places, and will always remain free of clogging earth by reason of the clearances as heretofore pointed out.

The reversal feature of the hoe enables the one instrument to be used on varying conditions and which, in the ordinary case, would necessitate the use of two or more hoes.

It is obvious that those skilled in the art may vary the details of construction and arrangement of parts without departing from the spirit of my invention, and therefore I do not wish to be limited to such features except as may be required by the claim.

What I claim is:—

A hoe comprising a blade having a semi-circular portion provided with a cutting edge; an opposed portion having relative angularly-disposed straight edges and an intermediate rounded edge; the body-portion of said blade being centrally cut away; said opposed hoe portions having each an angular and a circular aperture therethrough; and a shank provided with means for securing it to said blade through the medium of said apertures in either of said portions, substantially as described.

In testimony whereof I affix my signature in presence of two witnesses.

BERENT O. DAHL.

Witnesses:
J. HENRY BENNETT,
CHRIS. ELBFRON.

Copies of this patent may be obtained for five cents each, by addressing the "Commissioner of Patents, Washington, D. C."